United States Patent
Kobayashi et al.

(10) Patent No.: US 9,440,855 B2
(45) Date of Patent: Sep. 13, 2016

(54) HIGH PURITY CARBON NANOTUBE, PROCESS FOR PREPARING THE SAME AND TRANSPARENT CONDUCTIVE FILM USING THE SAME

(71) Applicants: Osaka University, Suita-shi, Osaka (JP); Nippon Kayaku Kabushiki Kaisha, Chiyoda-ku, Tokyo (JP)

(72) Inventors: Yoshihiro Kobayashi, Suita (JP); Ryota Negishi, Suita (JP); Shoji Koriyama, Suita (JP); Shogo Agata, Suita (JP); Kazuki Fujimoto, Suita (JP); Michiharu Arifuku, Tokyo (JP); Masaki Shinmoto, Tokyo (JP); Masahiro Imaizumi, Tokyo (JP); Noriko Kiyoyanagi, Tokyo (JP)

(73) Assignees: Osaka University, Osaka (JP); Nippon Kayaku Kabushiki Kaisha, Tokyo (JP)

( * ) Notice: Subject to any disclaimer, the term of this patent is extended or adjusted under 35 U.S.C. 154(b) by 131 days.

(21) Appl. No.: 13/764,981

(22) Filed: Feb. 12, 2013

(65) Prior Publication Data

US 2014/0056800 A1    Feb. 27, 2014

(30) Foreign Application Priority Data

Feb. 13, 2012    (JP) .................. 2012-027970

(51) Int. Cl.
   *C01B 31/02*    (2006.01)
(52) U.S. Cl.
   CPC ................. *C01B 31/0226* (2013.01)
(58) Field of Classification Search
   CPC ................................................ C01B 31/0226
   USPC ........ 423/447.1–447.3, 445 B; 977/742–754, 977/842–848; 428/367
   See application file for complete search history.

(56) References Cited

U.S. PATENT DOCUMENTS

2009/0285744 A1    11/2009    Sugihara et al.
2011/0008617 A1*    1/2011    Hata et al. .................... 428/341
2011/0014446 A1*    1/2011    Saito .............................. 428/220

FOREIGN PATENT DOCUMENTS

JP    2010-228970 A    10/2010
JP    2011-173739 A    9/2011
WO    2007/001031 A1    1/2007

OTHER PUBLICATIONS

Proceedings and Presentations of the 39th Conference of the Carbon Society of Japan, Published date of proceedings: Nov. 27, 2012, 27 pages, "Growth and characterization of metal-free carbon nanotubes from nanodiamonds", Fujimoto, et al.

(Continued)

*Primary Examiner* — Daniel C McCracken
(74) *Attorney, Agent, or Firm* — Nields, Lemack & Frame, LLC

(57) ABSTRACT

Problem
To provide a process for producing single-walled carbon nanotubes with which highly pure, high-quality single-walled carbon nanotubes can be produced with high efficiency, and to provide a transparent conductive film using the single-walled carbon nanotubes obtained by that production method.
Solution
A process for producing single-walled carbon nanotubes by chemical vapor deposition (CVD), wherein particles of a nonmetallic material containing 500 ppm or lower of metallic impurities including metals and compounds thereof are used as growth nuclei; and after a growth gas is introduced into a furnace used for growing carbon nanotubes, the growth gas used in an initial stage of growth of carbon nanotubes and the growth gas used in a stage of growth of regular carbon nanotubes (stationary growth stage) thereafter are prepared to different compositions and different partial pressures.

14 Claims, 12 Drawing Sheets

(56) References Cited

OTHER PUBLICATIONS

Nature Nanotechnology, vol. 6, Mar. 2011, pp. 156-161, "Flexible high-performance carbon nanotube integrated circuits", Sun, et al.

Nano Letters, vol. 7, No. 8, 2007, pp. 2272-2275, "Carbon Nanotube Growth from Semiconductor Nanoparticles", Takagi, et al.

J. Am. Chem. Soc., vol. 131, No. 20, 2009, pp. 6922-6923, "Carbon Nanotube Growth from Diamond", Takagi, et al.

English Translation of Proceedings and Presentations of the 72nd Conference of the Japan Society of Applied Physics, Published date of proceedings: Aug. 16, 2011, 11 pages, "Dependence of CNT yield synthesized from nanodiamond on growth gas composition", Koriyama, et al.

English Translation of Proceedings and Presentations of the 73rd Conference of the Japan Society of Applied Physics, Published date of proceedings: Aug. 27, 2012, 23 pages, "Efficient growth of carbon nanotube from nanodiamond particles by 2-step process", Fujimoto, et al.

English Translation of Proceedings and Presentations of the 39th Conference of the Carbon Society of Japan, Published date of proceedings: Nov. 27, 2012, 23 pages, "Growth and characterization of metal-free carbon nanotubes from nanodiamonds", Fujimoto, et al.

Proceedings and Presentations of the 73rd Conference of the Japan Society of Applied Physics, Published date of proceedings: Aug. 27, 2012, 25 pages, "Efficient growth of carbon nanotube from nanodiamond particles by 2-step process", Fujimoto, et al. (Japanese original).

* cited by examiner

AFM data of nanodiamonds after preheating treatment in Example 1

SEM image of single-walled carbon nanotubes obtained by heat treating for 15 minutes at 600°C in Example 1

Raman data of single-walled carbon nanotubes obtained by heat treating for 15 minutes at 600°C in Example 1

Signal

SEM-EDS data of commercially available carbon nanotubes

Raman spectrum of single-walled carbon nanotubes obtained from nanodiamonds having a high impurity content in Comparative example 2

SEM image of single-walled carbon nanotubes obtained without preheating treatment and with multiple-temperature conditions in Comparative example 3

Raman spectrum of single-walled carbon nanotubes obtained without preheating treatment and with multiple-temperature conditions in Comparative example 3

SEM image of single-walled carbon nanotubes obtained with ethanol/acetylene = 0/100 and a uniform temperature system in Example 2

Raman spectrum of single-walled carbon nanotubes obtained with ethanol/acetylene = 0/100 and a uniform temperature system in Example 2

SEM image of single-walled carbon nanotubes obtained with ethanol/acetylene = 100/0 and a uniform temperature system in Comparative example 4

Raman spectrum of single-walled carbon nanotubes obtained with ethanol/acetylene = 100/0 and a uniform temperature system in Comparative example 4

SEM image of single-walled carbon nanotubes obtained by multiple-temperature process in Example 3

Raman spectrum of single-walled carbon nanotubes obtained by multiple-temperature process in Example 3

SEM image of single-walled carbon nanotubes obtained with ethanol/acetylene = 100/0 in Comparative example 5

Raman spectrum of single-walled carbon nanotubes obtained with ethanol/acetylene = 100/0 in Comparative example 5

Raman spectrum of single-walled carbon nanotubes obtained in Example 4

Single-walled carbon nanotubes from Co in Comparative example 5

G band

Raman spectra of carbon nanotubes obtained in Example 5 (without switching of gas composition) and Example 6 (with switching of gas composition)

Raman spectra of carbon nanotubes obtained in Example 7 (without switching of gas composition) and Example 8 (with switching of gas composition)

HIGH PURITY CARBON NANOTUBE, PROCESS FOR PREPARING THE SAME AND TRANSPARENT CONDUCTIVE FILM USING THE SAME

1. FIELD OF THE INVENTION

The present invention relates to highly pure, high-quality single-walled carbon nanotubes containing substantially no metallic impurities, a process for producing same, and applications for same.

The present application asserts a priority claim for Japanese Patent Application 2012-27970, filed on Feb. 13, 2012, and the entire content thereof is incorporated by reference in the present specification.

2. DESCRIPTION OF THE RELATED ART

A carbon nanotube (hereinafter referred to as "CNT") is a structure in which a sheet (graphene) of carbon-based graphite is rolled into a tubular form, and the diameter of the tube is 0.4 nm at a minimum. Carbon nanotubes include single-walled carbon nanotubes, in which the tube is constituted by a sheet of a single-walled graphene, and multi-walled carbon nanotubes, which are constituted by a plurality of sheets. Single-walled carbon nanotubes, in particular, have excellent properties including high electrical conductivity, high current density, ballistic conduction, high thermal conductivity, mechanical strength, heat resistance, chemical stability, and narrow line width (Patent Document 1).

Processes used for producing single-walled carbon nanotubes include laser oven processes and arc discharge processes, but CVD processes, in which iron, cobalt, nickel, molybdenum, or other transition metals or compounds (oxides, carbides, or the like) thereof are used as catalysts, are widely used because of a characteristic of making possible highly efficient production of comparatively high-quality single-walled carbon nanotubes (Patent Document 2). However, single-walled carbon nanotubes produced by CVD processes contain as impurities large quantities of the metals or compounds (oxides, carbides, or the like) thereof used as catalysts. The impurities therefore must be removed in order to serve practical use, and carbon nanotube production process must include a step for refining after the CVD synthesis. However, treatment with acids and/or at high temperature is necessary in order to remove the impurities of the abovementioned metals or compounds thereof, but the synthesized single-walled carbon nanotubes are damaged in the process of treatment. As a result, the length of the carbon nanotubes is shortened due to breakage of the carbon nanotubes, or defects arise and bring about degradation of performance of the CNT. For example, in transparent conductive films, which are an important application of CNT, a problem is brought about that sufficient electrical conductivity is not obtained in single-walled carbon nanotubes with the transparency required for practical use (Non-Patent Document 1).

Meanwhile, as a CVD process in which nonmetallic solids are used as growth nuclei, there are reported processes for synthesizing single-walled carbon nanotubes in which nanoparticles of semiconductors (silicon, germanium, silicon carbide), oxides (silicon oxide), or diamond are used as growth nuclei (Patent Document 2, Non-Patent Documents 2 and 3). In the case of these processes, metal-free single-walled carbon nanotubes can be obtained because metals are not contained in the growth nuclei, but on the other hand, there is a problem that the growth efficiency is extremely low, single-walled carbon nanotubes having sufficient density cannot be obtained as mentioned below, and as a result synthesis in large quantities is difficult. There is also a problem that spontaneous pyrolysis of the raw material gas is significantly slow because the growth nuclei do not have catalytic effect for promoting decomposition of the raw material gas, a process temperature higher than in processes for producing carbon nanotubes using metal catalysts is required, and the substrate materials or device fabrication processes are limited.

In order to use single-walled carbon nanotubes as transparent conductive materials, a process is commonly used in which the single-walled carbon nanotubes are prepared into a disperse coating solution and the disperse coating solution is applied onto a substrate to obtain a transparent film. However, there is a problem that the single-walled carbon nanotubes are broken while undergoing the dispersing step in order to obtain the dispersed coating solution, and transparency and electrical conductivity are not simultaneously established. Furthermore, even in commercially available single-walled carbon nanotubes extolled as highly pure, there is a phenomenon that the haze value rises or the quality as a coating film or transparent conductive film is adversely affected because impurities of catalysts, or the like, separate and aggregate by undergoing the dispersing step.

The entire content of the documents mentioned above is incorporated by reference in the present specification.

Patent Documents

Patent Document 1: Japanese Patent Application Laying-open No. 2011-173739
Patent Document 2: Japanese Patent Application Laying-open No. 2010-228970

Non-Patent Documents

Non-Patent Document 1: Dong-ming Sun et al., Nature Nanotechnology 6, 156-161 (2011)
Non-Patent Document 2: D. Takagi et al., Nano Letters 7, 2272-2275 (2007)
Non-Patent Document 3: D. Takagi et al., Journal of American Chemical Society, 131, 6922-6923 (2009)

SUMMARY OF THE INVENTION

Thus, in the production of single-walled carbon nanotubes using metal catalysts or nonmetallic solids as growth nuclei, it has been difficult with the conventional technology to establish the highly efficient production of highly pure single-walled carbon nanotubes.

There is also pointed out in relation to applications to transparent conductive films, and the like, a quality problem with respect to applied products, which is caused by subjecting single-walled carbon nanotubes to a dispersing step.

The present invention was contrived in consideration of the abovementioned problems, and an object thereof is to provide a process for producing single-walled carbon nanotubes with which highly pure, high-quality single-walled carbon nanotubes simultaneously having reduced metallic impurities and reduced amorphous carbon can be produced with high efficiency in the production of highly pure single-walled carbon nanotubes using nonmetallic materials as growth nuclei, and to provide a transparent conductive film using the single-walled carbon nanotubes obtained by that production process.

The present invention relates to:

(1) a process for producing single-walled carbon nanotubes by chemical vapor deposition process (CVD process), wherein particles of a nonmetallic material containing 500 ppm or lower of metallic impurities including metals and their compounds thereof are used as growth nuclei; and after a growth gas is introduced into a furnace used for growing carbon nanotubes, the growth gas used in an initial stage of growth of carbon nanotubes and the growth gas used in a stage of growing carbon nanotubes stationarily (stationary growth stage) thereafter are prepared to different compositions and different partial pressures;

(2) the process for producing single-walled carbon nanotubes according to (1), wherein particles of a nonmetallic material containing 300 ppm or lower of said metallic impurities are used as growth nuclei;

(3) the process for producing single-walled carbon nanotubes according to (1) or (2), wherein nanodiamonds are used as the particles of a nonmetallic material;

(4) the process for producing single-walled carbon nanotubes according to any of (1) to (3), wherein the particles of a nonmetallic material are hydrogenated nanodiamonds;

(5) the process for producing single-walled carbon nanotubes according to any of (1) to (4), wherein a particle diameter for growth nuclei of nanodiamonds is 0.5 to 4 nm;

(6) the process for producing single-walled carbon nanotubes according to any of (1) to (5), wherein nanodiamonds treated in air at a high temperature of 500 to 700° C. and formed to have a particle diameter of 0.5 to 4 nm are used as growth nuclei;

(7) the process for producing single-walled carbon nanotubes according to any of (1) to (6), wherein a 50% nanodiamond particle diameter before high-temperature treatment in air is 4 to 10 nm;

(8) the process for producing single-walled carbon nanotubes according to any of (1) to (7), wherein the growth gas is any of a hydrocarbon, an alcohol, a mixture of a hydrocarbon and an alcohol, a mixture of a hydrocarbon and water, and a mixture of a hydrocarbon, an alcohol, and water;

(9) the process for producing single-walled carbon nanotubes according to (8), wherein ethanol is used as the alcohol growth gas and acetylene is used as the hydrocarbon growth gas;

(10) the process for producing single-walled carbon nanotubes according to (9), wherein a partial pressure ratio of ethanol and acetylene is 99.78:0.22 to 0:100;

(11) the process for producing single-walled carbon nanotubes according to (9) or (10), wherein argon is used as a diluent for acetylene;

(12) the process for producing single-walled carbon nanotubes according to any of (1) to (11), wherein a temperature on an upstream side of a substrate in the furnace used for growing carbon nanotubes is 700 to 900° C.; a temperature of the substrate periphery on which the carbon nanotubes are grown is 600 to 850° C.; and the temperature on the upstream side is always equal to or higher than the temperature of the substrate periphery;

(13) the process for producing single-walled carbon nanotubes according to (1), wherein ethanol and acetylene are used as the growth gas; a partial pressure ratio of ethanol and acetylene is 97.09:2.91 to 0:100 in the initial growth stage and 100:0 to 99.55:0.45 in the stationary growth stage; and the partial pressure ratio of ethanol to acetylene in the stationary growth stage is always greater than that in the initial growth stage;

(14) the process for producing single-walled carbon nanotubes according to (1), wherein in the furnace used for growing carbon nanotubes, a partial pressure of the growth gas is 0.1 Pa to 20 kPa in the initial growth stage and 0.02 Pa to 10 kPa in the stationary growth stage; and the pressure of the growth gas used in the stationary growth stage is lower than the pressure of the growth gas in the initial growth stage;

(15) the process for producing single-walled carbon nanotubes according to (1) or (14), wherein acetylene is used as the growth gas; a partial pressure of acetylene is 0.5 Pa to 20 Pa in the initial growth stage and 0.02 Pa to 10 Pa in the stationary growth stage; and the partial pressure of acetylene used in the stationary growth stage is lower than the partial pressure of acetylene in the initial growth stage;

(16) the process for producing single-walled carbon nanotubes according to any of (1) to (15), wherein in the furnace used for growing carbon nanotubes, total pressure of all gases used for the carbon nanotube growth is 0.02 Pa to 100 kPa;

(17) single-walled carbon nanotubes, being obtained by the production process according to any of (1) to (16), and containing 500 ppm or lower of metallic impurities (including oxides or other compounds); and

(18) a transparent conductive film obtained using the single-walled carbon nanotubes according to (17).

Effect of the Invention

Highly pure, high-quality single-walled carbon nanotubes can be obtained with high efficiency by the present invention. Transparent conductive films obtained using the single-walled carbon nanotubes have excellent performance over transparent conductive films containing single-walled carbon nanotubes obtained by other processes.

DESCRIPTION OF THE PREFERRED EMBODIMENTS

Figure 1A:
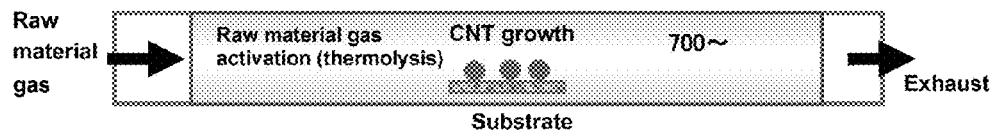
FIG. 1a is a diagram of a CVD apparatus with a uniform temperature zone.

Embodiments of the present invention are described below.

Nonmetallic materials that can be used for growth nuclei in the present invention include diamond, diamond-like carbon, amorphous carbon particles, fullerenes, graphite, carbon nanotubes, and other carbon materials, or composite materials of the abovementioned materials, but carbon materials that do not require a refining process, particularly diamond, are preferred, and nano-sized nanodiamond is more preferred. Metallic materials (including metals and oxides, carbides, and other compounds thereof) contained in the nonmetallic materials must be in a quantity that does not influence the product properties, that is, 500 ppm or lower, preferably 300 ppm or lower.

Diamonds that can be used in the present invention include natural monocrystalline diamonds, HTHP monocrystalline diamonds synthesized by high pressure and/or high temperature, polycrystalline diamond film synthesized by CVD method, diamonds synthesized by shock wave compression of graphite, and/or diamonds synthesized by detonation of explosives, but diamonds synthesized by shock wave compression of graphite and/or by detonation of explosives are preferred, and diamonds synthesized by detonation of explosives, which are most easily dispersed to nano size are more preferred. An example of a method for diamonds synthesized by detonation of explosives is described in WO2007/001031. The diamonds obtained by the aforementioned method are used as a dispersion having been micro-pulverized by bead milling or other pulverization process to an average particle size of 50 nm or smaller, preferably 30 nm or smaller, and more preferably 4 to 15 nm. A dispersion of nanodiamonds is usually stable at room temperature, but hydrogenated nanodiamonds obtained by heating of 300° C. to 800° C. in a hydrogen atmosphere are more preferably used in order to prepare the more stable nanodiamond dispersion in an organic solvent.

Nonmetallic materials used in the present invention are preferably those that were micro-pulverized by bead milling or other mechanical process for use. In such case, the beads also are micro-pulverized by milling and therefore mix into the nonmetallic material as impurities. When single-walled carbon nanotubes grew using such nonmetallic materials are applied in transparent conductive materials, and the like, the metal and other impurities must be reduced to the extent possible because the impurities adversely affect electrical conductivity, transparency, haze value, and other film properties. The aim is 500 ppm or lower, desirably 300 ppm or lower. Impurities originating from metals including metal oxides are usually converted to aqueous salts under acidic or alkaline conditions using water as a solvent and separated from the nonmetallic material. At this time, a heating step may be added and the refining step may be accelerated depending on the situation.

In the present invention, with regard to nanodiamonds, among the nonmetallic materials to become nuclei for growth of single-walled carbon nanotubes, the particle diameter must be 0.5 to 4 nm because growth does not occur with particle diameters of 5 nm or larger. When nanodiamonds are used in the aforementioned manner as materials for growth nuclei, the particle diameter must be prepared to a size in the abovementioned range because the particle diameter is larger than 4 nm. An example of a process that can be used is a process in which a dispersion of nanodiamonds is usually applied on a substrate and dried, and the sample is then heat treated and the nanodiamonds are rendered into the desired growth nuclei. The conditions are: treatment temperature 500 to 800° C. and treatment time 1 minute to 60 minutes, desirably 500 to 700° C. and treatment time 1 minute to 30 minutes, in the case without air flow during treatment; and 500 to 700° C. and treatment time 30 seconds to 30 minutes, desirably 500 to 600° C. and treatment temperature 30 seconds to 15 minutes, in the case with air flow during treatment. As for the particle diameter of the nanodiamonds before treatment, the preferable diameter is depending on the treatment temperature and treatment time. In order to obtain a particle diameter of 0.4 to 4 nm that is stable after heat treatment homogeneously with high density and in a comparatively short time, the 50% particle diameter of the nanodiamonds before heat treatment is preferably prepared to 50 nm or smaller, desirably 30 nm or smaller, and more desirably 4 to 15 nm.

Growth gases that can be used as carbon sources in the present invention include any of hydrocarbons, alcohols, mixtures of hydrocarbons and alcohols, mixtures of hydrocarbons and water, mixtures of hydrocarbons, alcohols, and water, or carbon dioxide. Hydrocarbons include: methane, ethane, propane, butane, and other saturated hydrocarbons; ethylene, propylene, butene, acetylene, and other unsaturated hydrocarbons; cyclohexane, cyclohexene, and other alicyclic hydrocarbons; and benzene, toluene, xylene, and other aromatic hydrocarbons. Unsaturated hydrocarbons and aromatic hydrocarbons are preferred, unsaturated hydrocarbons are more preferred, and acetylene is even more preferred. Oxygen-containing compounds may also be mixed in order to suppress the production of unstable defects or amorphous carbon produced during growth of CNT. Oxygen-containing substances include water, alcohols, ketones, esters, and ethers. Alcohols include: methanol, ethanol, propyl alcohol, butanol, octyl alcohol, ethylene glycol, propylene glycol, glycerol, and other aliphatic alcohols; cyclopentyl alcohol, cyclohexyl alcohol, and other alicyclic alcohols; ethoxy ethanol, propylene glycol monomethyl ether, and other glycol ethers; phenol, cresol, and other aromatic alcohols; acetone, methyl ethyl ketone, methyl isobutyl ketone, and other ketones; ethyl acetate, butyl acetate, propylene glycol monoacetate, and other carboxylic esters; and ethyl ether, ethylene glycol dimethyl ether, and other ethers. Although what is used differs in accordance with the circumstances, water and alcohols are preferred, and water and ethanol are more preferred. The oxygen-containing compounds above, excluding water, can also be used as carbon sources.

High quality, high purity, metal-free, and high efficiency in the present invention are defined as follows. High quality is expressed by an intensity ratio I(G)/I(D) of a G band (near 1590 cm$^{-1}$) originating from the graphene structure of the CNT in the Raman spectrum of the CNT and a D band (near 1350 cm$^{-1}$) originating from defects or lattice defects present on the CNT wall, and the quality can be considered to be higher as the ratio is higher. High purity signifies low content of amorphous carbon or metallic impurities; the amorphous carbon content is evaluated by the I(G)/(D) ratio, and the metallic impurity content is evaluated by chemical or physical analysis. Metal-free indicates the amount of metallic impurities that can be used for transparent conductive uses, and is 500 ppm or lower, desirably 300 ppm or lower. High efficiency signifies the extent of CNT growth, and is indicated by an intensity ratio I(G)/I(Si) of the G band and Raman signals around 520 cm$^{-1}$ originating from silicon when the CNT is grown on a silicon substrate, and growth is determined to occur with higher efficiency (higher yield) as the numeric value is higher.

The hydrocarbons as carbon sources in the present invention can be used singly, and the hydrocarbons may be used mixed with oxygen-containing compounds. The gas mixture ratio may be constant during growth, but can also be changed in midcourse of growth. In the case of ethanol and acetone, the partial pressure ratio of ethanol/acetone is preferably 99.78:0.22 to 0:100. More preferably, the gas composition is set to 97.09:2.91 to 0:100 in the initial growth stage, and is set to 100:0 to 99.55:0.45 in the stage of growth of carbon nanotubes (stationary growth stage) thereafter, and the partial pressure ratio of ethanol to acetylene in the stationary growth stage is always set greater than in the initial growth stage. Acetylene is flammable and extremely prone to ignition, the explosive range is wide with an explosion limit of 2.5 to 93%, and the risk of explosion is extremely great. Therefore, acetylene is desirably diluted with a highly safe inert gas, and argon is preferably used. The concentration of acetylene in the dilute gas is usually 2.5% or lower, preferably 2%, to be away from the explosion limit.

In the present invention, carbon nanotubes are most often grown while keeping the pressure constant in the case when growth gas alone is used, or the respective partial pressures and the total gas pressure, being the sum of the partial pressures, in the case when a plurality of gases is used, including growth gas, diluting gas, and carrier gas, but these pressures may be changed in midcourse of growth. In the case when the gas pressure is constant, the gas pressure is a range from 0.02 Pa to 20 kPa, preferably a range from 0.1 Pa to 10 kPa. Carbon nanotubes that are of higher quality than in the case when the pressure is constant can be produced with high efficiency by suitably changing the pressure in midcourse of growth. The condition for that is a range of growth gas pressure from 0.02 Pa to 20 kPa, more preferably 0.1 Pa to 20 kPa in the initial growth stage and 0.02 Pa to 10 kPa in the stationary growth stage, and the pressure of the growth gas in the stationary growth stage is set smaller than in the initial growth stage. The total gas pressure in the CVD apparatus is usually in a range from 0.02 Pa to 100 kPa, preferably 10 Pa to 20 kPa.

The pressure of all gases including growth gas, diluting gas, and carrier gas is most often set constant during growth, but may be changed usually in a range from 0.02 Pa to 100 kPa, preferably 10 Pa to 20 kPa, in coordination with the change of the pressure of the growth gas.

The compositions of the aforementioned gases also may be changed simultaneously with changing of the partial pressures and the pressure of all gases, being the sum of the partial pressures, between the initial growth stage and the stationary growth stage.

A CVD reaction apparatus that can be used in the present invention when a nonmetallic material is used as growth nuclei is a conventional apparatus as illustrated in FIG. 1a, in which a gas activation temperature and a CNT growth temperature are in a single temperature zone. Because the nonmetallic particles do not have any catalytic activity for promoting decomposition of the raw material gas as does iron, cobalt, or other metallic catalyst used in the conventional technology, the treatment must be performed at or above a temperature at which the raw material gas causes spontaneous pyrolysis. The optimal temperature for that differs according to chemical species and their mixture composition of the growth gas used, but is usually 700 to 1000° C.

Figure 1B:
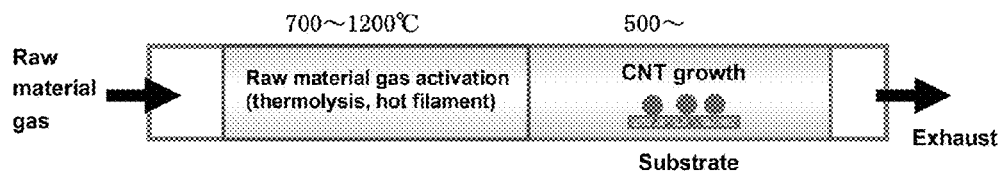
FIG. 1b is a diagram of a CVD apparatus with multiple temperature zones.

A multiple-temperature-zone CVD apparatus as illustrated in FIG. 1b, in which the raw material gas activation temperature and the single-walled carbon nanotube growth temperature are set separately, is more desirable in order to obtain high-quality, highly pure single-walled carbon nanotubes with high efficiency. By using this apparatus, surface diffusion on the growth nuclei and the process of formation of single-walled carbon nanotubes can be independently controlled, and high-quality, highly pure single-walled carbon nanotubes can be obtained with higher efficiency. In this case as well, the optimal temperature range differs according to the chemical species, partial pressure, and their mixture composition of the growth gas used, but the raw material gas activation temperature on the upstream side is 700 to 1200° C., preferably 700 to 900° C., and the temperature of the substrate periphery is 500 to 1000° C., preferably 600 to 850° C. At this time, results suitable for high-performance, high-quality growth can be obtained by setting to conditions such that the temperature on the upstream side is well higher than the pyrolysis temperature of growth gas and the temperature surrounding the material is always equal to or higher than that.

Transparent conductive films obtained using the single-walled carbon nanotubes of the present invention can be used as electrodes of flat panel displays, solar cells, or touch panels; transparent heaters of vehicular front window glass, refrigerator show window, or other antifogging window glass; antistatic films for various purposes, electromagnetic shielding films, and the like. In order to prepare a transparent conductive film using single-walled carbon nanotubes produced from a metal catalyst, generally the metals contained in the single-walled carbon nanotubes are removed to prepare refined single-walled carbon nanotubes, then the single-walled carbon nanotubes are subjected to a dispersing step to prepare a disperse coating solution, the disperse coating solution is applied onto a substrate and dried to prepare a transparent conductive film. However, even though the step for removal of the metals is performed, the metals in the CNT cannot be lowered to the quantity of impurities of the present invention. There is also a problem that defects arise in the single-walled carbon nanotubes or breakage occurs in the refining step. There is furthermore a problem that the single-walled carbon nanotubes break in the dispersing step and the electrical conductivity decreases as a result. There is furthermore a problem that the metal impurities that could not be removed separate and aggregate in the dispersing step, the haze value of the conductive film rises, and the performance as a transparent film is impaired. With single-walled carbon nanotubes obtained by the present invention, a step for removal of metals is not required because the content of metallic impurities is extremely small. A dispersing step also is not required because the single-walled carbon nanotubes can be applied directly on a substrate, and the grown single-walled carbon nanotubes can be used as such. Therefore, transparent conductive films excellent in electrical conductivity and transparency can be obtained. On the other hand, transparent conductive films obtained with single-walled carbon nanotubes with a similar yield using a metal catalyst by the same process are inferior in electrical conductivity compared with the conductive film of the present invention, although the reason is unknown. In the case when a substrate that is not heat resistant, such as a resin film, is used, a transparent conductive film can be obtained by fixing the single-walled carbon nanotubes on the film through preparation and cooling steps using a process similar to the CoMoCAT process. The performance as a transparent conductive film varies depending on the application, but is $10^5$ Ω/sq or lower, preferably $10^4$ Ω/sq or lower, and more preferably $10^3$ Ω/sq or lower.

EXAMPLES

The present invention is described in detail below with reference to examples. The present invention is not limited to the examples described below.

Example 1

Figure 2:
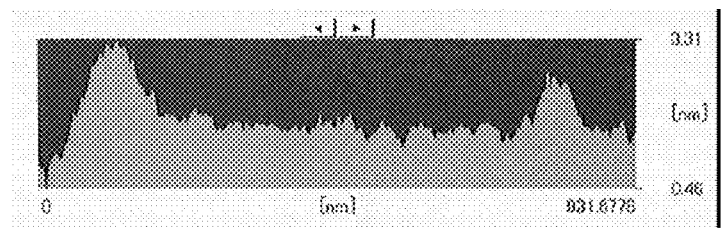
FIG. 2 is AFM data of nanodiamonds after high-temperature treatment (preheating treatment) in Example 1.
Figure 3:
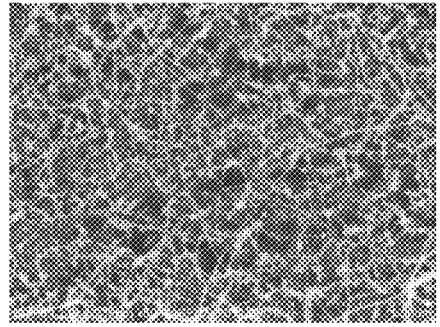
FIG. 3 is a SEM image of single-walled carbon nanotubes obtained by high temperature treatments for 15 minutes at 600° C. in Example 1.
Figure 4:
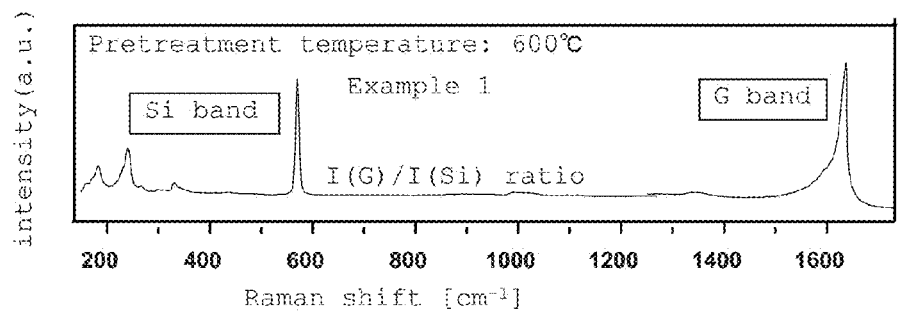
FIG. 4 is Raman data of single-walled carbon nanotubes obtained by high temperature treatment for 15 minutes at 600° C. in Example 1.

A 0.5% ethanol dispersion of hydrogenated nanodiamonds (Ustalla Type C, manufactured by Nippon Kayaku) having a particle size distribution of 5 to 15 nm and 100 ppm of metallic impurities was applied dropwise on a 1 $cm^2$ silicon substrate and dried, and a sample coated with hydrogenated nanodiamonds was obtained. The coated sample was then placed in a heating oven and heat-treated for 15 minutes in air at 600° C., and 0.5 to 4 nm growth nuclei of hydrogenated nanodiamonds were obtained. FIG. 2 illustrates results of measurement of the growth nuclei by atomic force microscope (AFM). The sample was placed in a CVD apparatus with multiple temperature zones illustrated in FIG. 1b, a gas containing 8 sccm of ethanol, 8 sccm of acetylene (diluted to 2% with argon), and 4 sccm of argon/hydrogen carrier flowed for 30 minutes under conditions of 850° C. upstream temperature, 780° C. temperature of the sample periphery, and 500 Pa pressure, and single-walled carbon nanotubes were obtained. FIG. 3 illustrates an SEM image of the single-walled carbon nanotubes thus obtained. It was determined by SEM-EDS that impurities originating from metals could not be detected and metal-free single-walled carbon nanotubes were produced. When the intensity ratio (I(G)/I(Si) ratio) of the G band originating from the carbon nanotubes and the Si band originating from the Si using Raman spectroscopy, a high value of 1.1 (FIG. 4) was obtained, indicating that single-walled carbon nanotubes were produced with high efficiency (high yield). It was also determined from the I(G)/I(D) ratio that higher quality single-walled carbon nanotubes were obtained, compared with an untreated product of Comparative example 2 to be described.

Comparative Example 1

Figure 5:
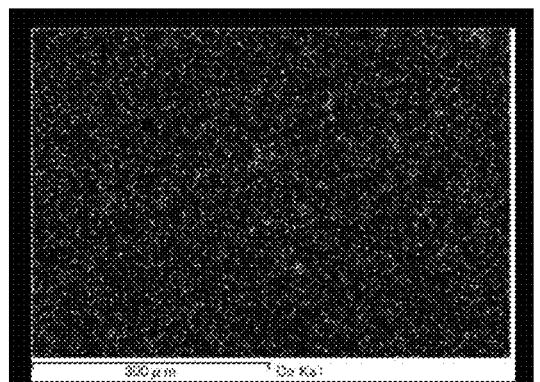
FIG. 5 is SEM-EDS data of commercially available single-walled carbon nanotubes.
Figure 5:
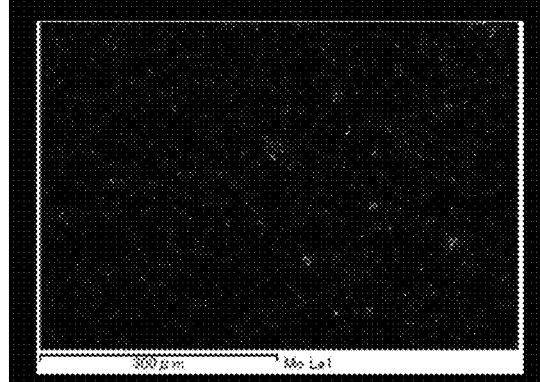
Figure 5:
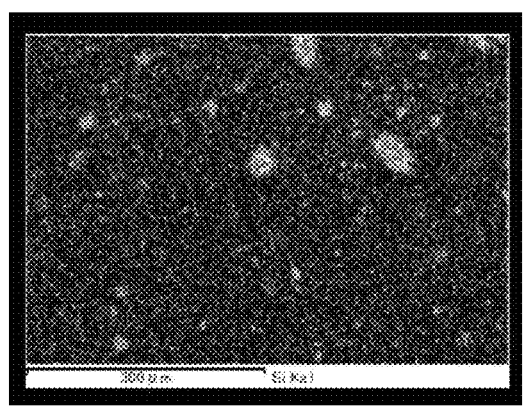

When commercially available carbon nanotubes known to be of high quality were observed by SEM-EDS, cobalt, molybdenum, and silicon were detected (FIG. 5).

Comparative Example 2

Figure 6:
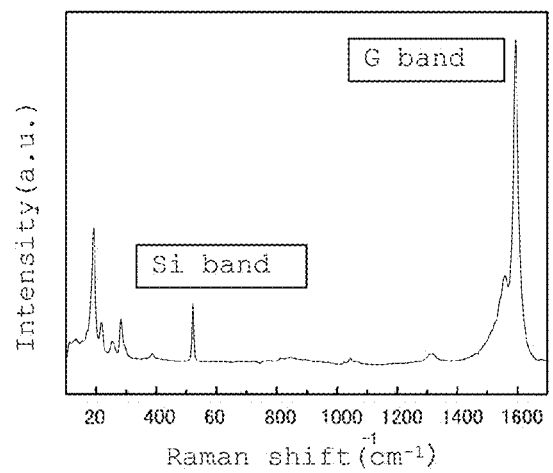
FIG. 6 is a Raman spectrum of single-walled carbon nanotubes obtained from highly pure nanodiamonds in Comparative example 2.

A 0.5% ethanol dispersion of hydrogenated nanodiamonds having a particle size distribution of 5 to 10 nm and 23000 ppm of metallic impurities was applied dropwise on a 1 $cm^2$ silicon substrate and dried, and a sample coated with hydrogenated nanodiamonds was obtained. The coated sample was then placed in a heating oven and heat-treated for 15 minutes in air at 600° C., and 0.5 to 4 nm growth nuclei of hydrogenated nanodiamonds were obtained. The sample was placed in a CVD apparatus with multiple temperature zones illustrated in FIG. 1b, a gas containing 8 sccm of ethanol, 8 sccm of acetylene (diluted to 2% with argon), and 4 sccm of argon/hydrogen carrier flowed for 30 minutes under conditions of 850° C. upstream temperature, 780° C. temperature of the sample periphery, and 500 Pa pressure, and single-walled carbon nanotubes were obtained. FIG. 6 illustrates a Raman spectrum of the single-walled carbon nanotubes thus obtained. It was determined by I(G)/I(Si) that single-walled carbon nanotubes were produced with high efficiency, but impurities originating from zirconium were detected by SEM-EDS.

Comparative Example 3

Figure 7:
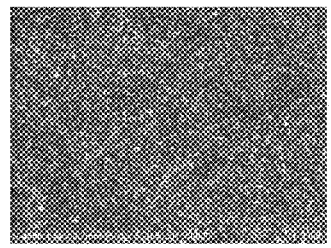
FIG. 7 is a SEM image of single-walled carbon nanotubes obtained without preheating treatment and with multiple-temperature conditions in Comparative example 3.
Figure 8:
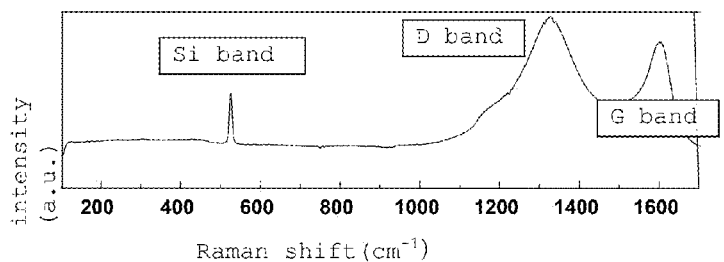
FIG. 8 is a Raman spectrum of single-walled carbon nanotubes obtained without preheating treatment and with multiple-temperature conditions in Comparative example 3.

A 0.5% ethanol dispersion of hydrogenated nanodiamonds having a particle size distribution of 5 to 10 nm and 100 ppm of metallic impurities was applied dropwise on a 1 $cm^2$ silicon substrate and dried, and a sample coated with hydrogenated nanodiamonds was obtained. The sample was then placed in a CVD apparatus with multiple temperature zones illustrated in FIG. 1b, a gas containing 8 sccm of ethanol, 8 sccm of acetylene (diluted to 2% with argon), and 4 sccm of argon/hydrogen carrier flowed for 30 minutes under conditions of 850° C. upstream temperature, 780° C. temperature of the sample periphery, and 500 Pa pressure, and single-walled carbon nanotubes (SEM image in FIG. 7) were obtained, but the single-walled carbon nanotubes were of low quality with defects in the structure, as is clear from the I(G)/I(D) ratio of the G band and the D band of the Raman spectrum (FIG. 8) of the single-walled carbon nanotubes.

Example 2

Examination of Ratio of Ethanol and Acetylene

Figure 9:
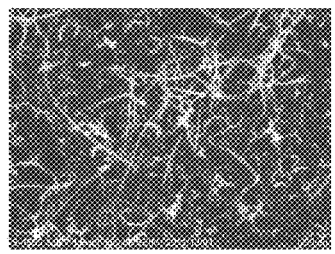
FIG. 9 is a SEM image of single-walled carbon nanotubes obtained with ethanol/acetylene=0/100 and a uniform temperature system in Example 2.
Figure 10:
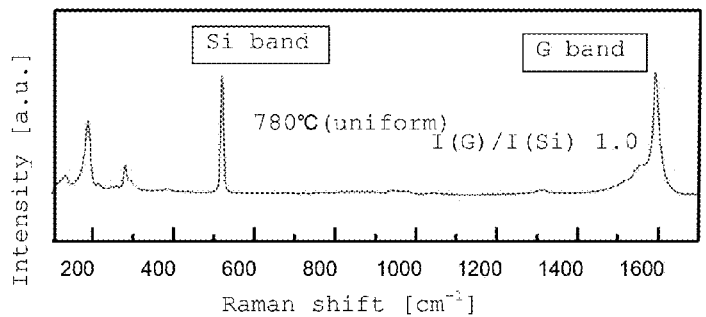
FIG. 10 is a Raman spectrum of single-walled carbon nanotubes obtained with ethanol/acetylene=0/100 and a uniform temperature system in Example 2.

A 0.5% ethanol dispersion of hydrogenated nanodiamonds having a particle size distribution of 5 to 10 nm and 100 ppm of metallic impurities was applied dropwise on a 1 $cm^2$ silicon substrate and dried, and a sample coated with hydrogenated nanodiamonds was obtained. The coated sample was then placed in a heating oven and heat-treated for 10 minutes in air at 600° C., and 0.5 to 4 nm growth nuclei of hydrogenated nanodiamonds were obtained. The sample was placed in a CVD apparatus with a uniform temperature zone illustrated in FIG. 1a, a gas containing 0 sccm of ethanol, 20 sccm of acetylene (diluted to 2% with argon), and 0 sccm of argon/hydrogen carrier flowed for 30 minutes under conditions of 780° C. intrasystem temperature and 250 Pa pressure, and single-walled carbon nanotubes were obtained. FIG. 9 illustrates a SEM image of the single-walled carbon nanotubes thus obtained. When the intensity ratio (I(G)/I(Si) ratio) of the G band originating from the carbon nanotubes and the Si band originating from the Si using Raman spectroscopy, a high value of 1.0 (FIG. 10) was obtained, indicating that single-walled carbon nanotubes were produced with high efficiency (high yield).

Comparative Example 4

Figure 11:
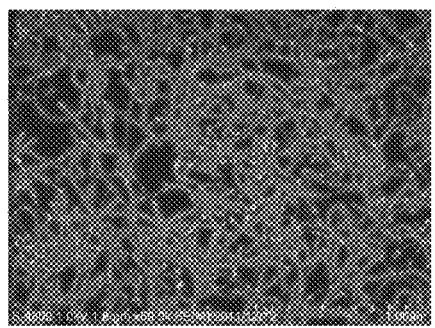
FIG. 11 is a SEM image of single-walled carbon nanotubes obtained with ethanol/acetylene=100/0 and a uniform temperature system in Comparative example 4.
Figure 12:
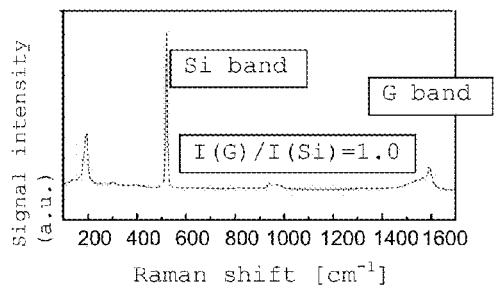
FIG. 12 is a Raman spectrum of single-walled carbon nanotubes obtained with ethanol/acetylene=100/0 and a uniform temperature system in Comparative example 4.

A 0.5% ethanol dispersion of hydrogenated nanodiamonds having a particle size distribution of 5 to 10 nm and 100 ppm of metallic impurities was applied dropwise on a 1 $cm^2$ silicon substrate and dried, and a sample coated with hydrogenated nanodiamonds was obtained. The coated sample was then placed in a heating oven and heat-treated for 10 minutes in air at 600° C., and 0.5 to 4 nm growth nuclei of hydrogenated nanodiamonds were obtained. The sample was placed in a CVD with a uniform temperature zone illustrated in FIG. 1a, a gas containing 20 sccm of ethanol, 0 sccm of acetylene, and 0 sccm of argon/hydrogen carrier flowed for 30 minutes under conditions of 780° C. intrasystem temperature and 250 Pa pressure, and single-walled carbon nanotubes were obtained. FIG. 11 illustrates a SEM image of the single-walled carbon nanotubes thus obtained. When the intensity ratio (I(G)/I(Si) ratio) of the G band originating from the carbon nanotubes and the Si band originating from the Si using Raman spectroscopy, [the ratio] was 0.15, indicating low efficiency (low yield).

Example 3

Figure 13:
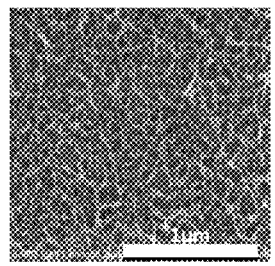
FIG. 13 is a SEM image of single-walled carbon nanotubes obtained by multiple-temperature process in Example 3.
Figure 14:
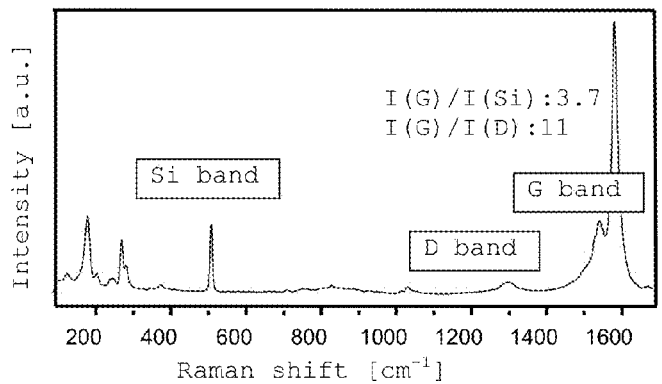
FIG. 14 is a Raman spectrum of single-walled carbon nanotubes obtained by multiple-temperature process in Example 3.

A 0.5% ethanol dispersion of hydrogenated nanodiamonds having a particle size distribution of 5 to 10 nm and 100 ppm of metallic impurities was applied dropwise on a 1 $cm^2$ silicon substrate and dried, and a sample coated with hydrogenated nanodiamonds was obtained. The coated sample was then placed in a heating oven and heat-treated for 10 minutes in air at 600° C., and 0.5 to 4 nm growth nuclei of hydrogenated nanodiamonds were obtained. The sample was placed in a CVD apparatus with multiple temperature zones illustrated in FIG. 1b, a gas containing 0 sccm of ethanol, 20 sccm of acetylene (diluted to 2% with argon), and 0 sccm of argon/hydrogen carrier flowed for 30 minutes under conditions of 850° C. upstream temperature, 780° C. temperature of the sample periphery, and 250 Pa pressure, and single-walled carbon nanotubes were obtained. FIG. 13 illustrates a SEM image of the single-walled carbon nanotubes thus obtained. A high value of 3.7 (FIG. 14) was obtained in the intensity ratio I(G)/I(Si) ratio of the G band originating from the carbon nanotubes and the Si band originating from the Si, indicating that single-walled carbon nanotubes were produced with high efficiency (high yield). The I(G)/I(D) ratio also was 11, indicating that high-quality single-walled carbon nanotubes were obtained.

Comparative Example 5

Figure 15:
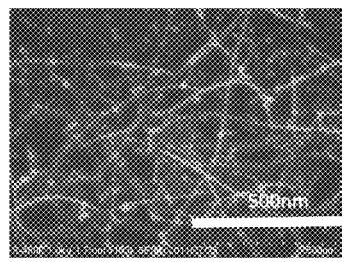
FIG. 15 is a SEM image of single-walled carbon nanotubes obtained with ethanol/acetylene=100/0 in Comparative example 5.
Figure 16:
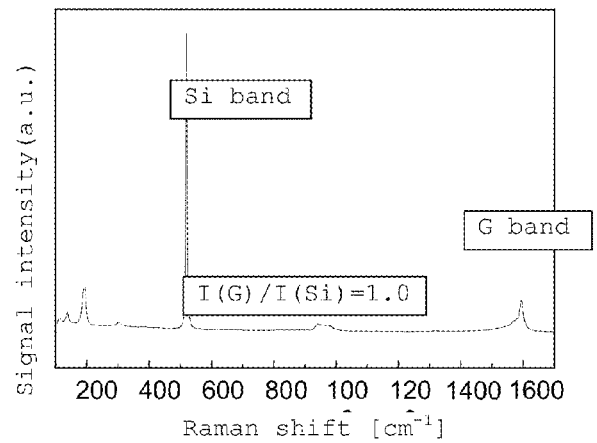
FIG. 16 is a Raman spectrum of single-walled carbon nanotubes obtained with ethanol/acetylene=100/0 in Comparative example 5.

A 0.5% ethanol dispersion of hydrogenated nanodiamonds having a particle size distribution of 5 to 10 nm and 100 ppm of metallic impurities was applied dropwise on a 1 $cm^2$ silicon substrate and dried, and a sample coated with hydrogenated nanodiamonds was obtained. The coated sample was then placed in a heating oven and heat-treated for 10 minutes in air at 600° C., and 0.5 to 4 nm growth nuclei of hydrogenated nanodiamonds were obtained. The sample was placed in a CVD apparatus with multiple temperature zones illustrated in FIG. 1b, a gas containing 1 sccm of ethanol, 0 sccm of acetylene, and 19 sccm of argon/hydrogen carrier flowed for 30 minutes under conditions of 850° C. upstream temperature, 780° C. temperature of the sample periphery, and 250 Pa pressure, and single-walled carbon nanotubes were obtained. FIG. 15 illustrates a SEM image of the single-walled carbon nanotubes thus obtained. Although high-quality single-walled carbon nanotubes were obtained, with I(G)/I(D) ratio=60, the I(G)/I(Si) ratio was 0.11 (FIG. 16), and single-walled carbon nanotubes could only be obtained with low yield (low efficiency).

Example 4

Figure 17:
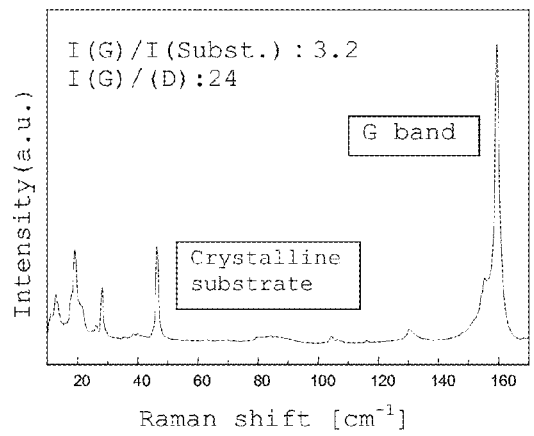
FIG. 17 is a Raman spectrum of single-walled carbon nanotubes obtained in Example 4.

A 0.5% ethanol dispersion of hydrogenated nanodiamonds having a particle size distribution of 5 to 10 nm and 100 ppm of metallic impurities was applied dropwise on a 1 $cm^2$ crystalline substrate and dried, and a sample coated with hydrogenated nanodiamonds was obtained. The coated sample was then placed in a heating oven and heat-treated for 10 minutes in air at 600° C., and 0.5 to 4 nm growth nuclei of hydrogenated nanodiamonds were obtained. The sample was placed in a CVD apparatus with multiple temperature zones illustrated in FIG. 1b, a gas containing 4 sccm of ethanol, 12 sccm of acetylene (diluted to 2% with argon), and 4 sccm of argon/hydrogen carrier flowed for 30 minutes under conditions of 850° C. upstream temperature, 780° C. temperature of the sample periphery, and 250 Pa pressure, and single-walled carbon nanotubes were obtained. When the single-walled carbon nanotubes thus obtained were evaluated by Raman spectroscope, the I(G)/I(Subst.) ratio was high at 3.2, and a high value of 24 (FIG. 17) was obtained also in the I(G)/I(D) ratio. These values indicate that high-quality single-walled carbon nanotubes were obtained with high yield (high efficiency). The transmittance of the single-walled carbon nanotube film thus obtained was 97% or higher, and the surface resistance value was $9.44 \times 10^3$ Ω/sq.

Comparative Example 6

Figure 18:
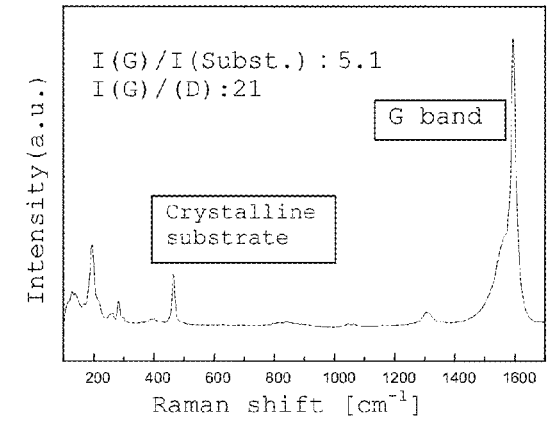
FIG. 18 is single-walled carbon nanotubes containing Co obtained in Comparative example 6.

Cobalt was vapor-deposited on a 1 $cm^2$ crystalline substrate and a Co sample having 0.1 nm growth nuclei was obtained. This sample was heat-treated for 10 minutes in air at 600° C. in a heating furnace. The sample was then placed in a CVD apparatus with multiple temperature zones illustrated in FIG. 1b, a gas containing 8 sccm of ethanol, 0 sccm of acetylene, and 17 sccm of argon/hydrogen carrier flowed for 30 minutes under conditions of 750° C. intrasystem temperature and 340 Pa pressure, and single-walled carbon nanotubes were obtained. Synthesis of single-walled carbon nanotubes was carried out with the same conditions as with a Si sample in order to confirm the efficiency and quality with the abovementioned conditions. When the obtained single-walled carbon nanotubes were evaluated by Raman spectroscope, the I(G)/I(Subst.) ratio was high at 5.1, the I(G)/I(D) ratio also was 21 (FIG. 18), and high-quality single-walled carbon nanotubes were obtained with nearly equally high yield (high efficiency) as in Example 4. However, when the performance as a transparent conductive film was evaluated, the film transmittance was 97%, and the surface resistance value was $4.42 \times 10^6$ Ω/sq. The surface resistance value was inferior compared with Example 4 even though the CNT quality and production efficiency were equal.

Example 5

Figure 19:
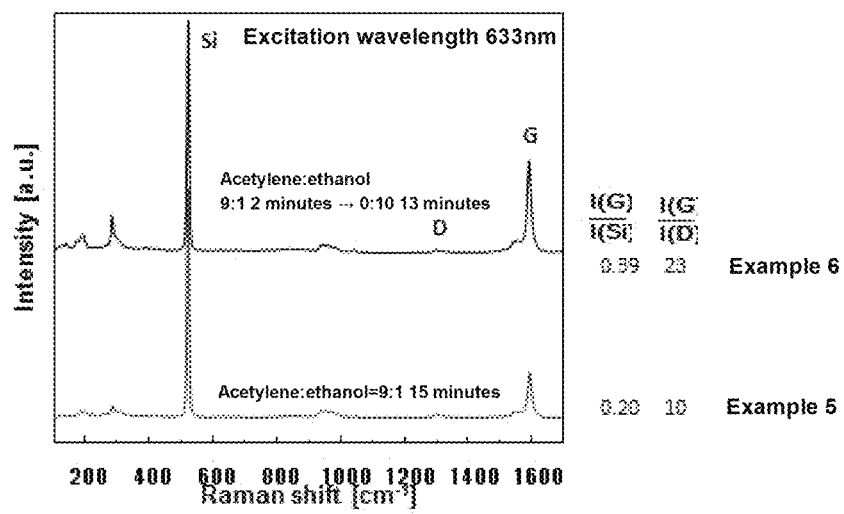
FIG. 19 is Raman spectra of carbon nanotubes obtained in Example 5 (without switching of gas composition) and Example 6 (with switching of gas composition)

A 0.5% ethanol dispersion of hydrogenated nanodiamonds having a particle size distribution of 5 to 10 nm and 100 ppm of metallic impurities was applied dropwise on a 1 cm$^2$ crystalline substrate and dried, and a sample coated with hydrogenated nanodiamonds was obtained. The coated sample was then placed in a heating oven and heat-treated for 10 minutes in air at 600° C., and 0.5 to 4 nm growth nuclei of hydrogenated nanodiamonds were obtained. The sample was placed in a CVD apparatus with multiple temperature zones illustrated in FIG. 1b, a gas containing 1 sccm of ethanol, 9 sccm of acetylene (diluted to 2% with argon), and 10 sccm of argon/hydrogen carrier flowed for 15 minutes under conditions of 850° C. upstream temperature, 780° C. temperature of the sample periphery, and 500 Pa pressure, and single-walled carbon nanotubes were obtained. When the single-walled carbon nanotubes thus obtained were evaluated by Raman spectroscope, the I(G)/I(Si) ratio was 0.20, and the I(G)/I(D) ratio was 10 (FIG. 19). These values indicate that high-quality single-walled carbon nanotubes were obtained with high yield (high efficiency).

Example 6

With the same process and same conditions as in Example 5, a sample was placed in a CVD apparatus with multiple temperature zones, and a gas containing 1 sccm of ethanol, 9 sccm of acetylene (diluted to 2% with argon), and 10 sccm of argon/hydrogen carrier flowed for 2 minutes under conditions of 850° C. upstream temperature, 780° C. temperature of the sample periphery, and 500 Pa pressure. The gas was then switched to a gas containing 10 sccm of ethanol and 10 sccm of argon/hydrogen carrier and circulated for 13 minutes, and single-walled carbon nanotubes were obtained. When the single-walled carbon nanotubes thus obtained were evaluated by Raman spectroscope, the I(G)/I(Si) ratio was 0.39, and the I(G)/I(D) ratio was 23 (FIG. 19). These values indicate that single-walled carbon nanotubes of higher quality were obtained with higher yield (higher efficiency) than in Example 5.

Example 7

Figure 20:
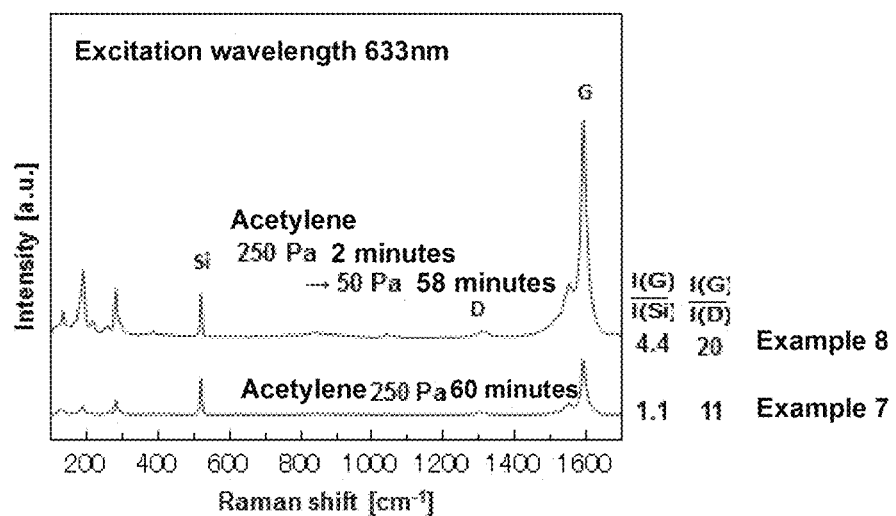
FIG. 20 is Raman spectra of carbon nanotubes obtained in Example 7 (without switching of gas pressure) and Example 8 (with switching of gas pressure).

A 2.0 wt % ethanol dispersion of hydrogenated nanodiamonds having a particle size distribution of 5 to 10 nm and 100 ppm of metallic impurities was applied dropwise on a 1 cm$^2$ crystalline substrate and dried, and a sample coated with hydrogenated nanodiamonds was obtained. The coated sample was then placed in a heating oven and heat-treated for 15 minutes in air at 600° C., and 0.5 to 4 nm growth nuclei of hydrogenated nanodiamonds were obtained. The sample was placed in a CVD apparatus with multiple temperature zones illustrated in FIG. 1b, a gas containing 10 sccm acetylene (diluted to 2% with argon) and 10 sccm of argon/hydrogen carrier flowed for 60 minutes under conditions of 850° C. upstream temperature, 780° C. temperature of the sample periphery, and 500 Pa pressure, and single-walled carbon nanotubes were obtained. When the single-walled carbon nanotubes thus obtained were evaluated by Raman spectroscope, the I(G)/I(Si) ratio was 1.14, and the I(G)/I(D) ratio was 11 (FIG. 20). These values indicate that high-quality single-walled carbon nanotubes were obtained with high yield (high efficiency).

Example 8

With the same process and same conditions as in Example 5, a sample was placed in a CVD apparatus with multiple temperature zones, and a gas containing 10 sccm of acetylene (diluted to 2% with argon) and 10 sccm of argon/hydrogen carrier flowed for 2 minutes under conditions of 850° C. upstream temperature, 780° C. temperature of the sample periphery, and 500 Pa pressure. A gas having reduced the growth gas partial pressure to 1/5, containing 2 sccm of acetylene (diluted to 2% with argon) and 18 sccm of argon/hydrogen carrier was then circulated for 58 minutes, and single-walled carbon nanotubes were obtained. When the single-walled carbon nanotubes thus obtained were evaluated by Raman spectroscope, the I(G)/I(Si) ratio was 4.42, and the I(G)/I(D) ratio was 20 (FIG. 20). These values indicate that single-walled carbon nanotubes of higher quality were obtained with higher yield (higher efficiency) than in Example 7. The transmittance of the single-walled carbon nanotube film thus obtained was 97% or higher, and the surface resistance value was $7.3 \times 10^3$ Ω/sq.

INDUSTRIAL UTILITY

Carbon nanotubes have prospects not only for use in fields such as semiconductors and optical devices, but also for use as carriers for drug delivery (DDS). In particular, carbon nanotubes containing no impurities such as in the present invention are expected to be applied as more excellent DDS.

What is claimed is:

1. A process for producing single-walled carbon nanotubes by chemical vapor deposition (CVD), comprising:
providing growth nuclei comprising particles of a nonmetallic material containing 500 ppm or lower of metallic impurities including metals and compounds of the metals;
introducing a growth gas for growth of carbon nanotubes in an initial growth stage into a furnace, and
thereafter introducing a growth gas for stationary growth of carbon nanotubes in a stationary growth stage,
wherein the growth gas for growth of carbon nanotubes in the initial growth stage is different from the growth gas for stationary growth of carbon nanotubes in the stationary growth stage in composition and/or partial pressure.

2. The process for producing single-walled carbon nanotubes according to claim 1, wherein the growth nuclei comprise particles of a nonmetallic material containing 300 ppm or lower of said metallic impurities.

3. The process for producing single-walled carbon nanotubes according to claim 1 or 2, wherein the particles of a nonmetallic material are nanodiamonds.

4. The process for producing single-walled carbon nanotubes according to claim 1 or 2, wherein the particles of a nonmetallic material are hydrogenated nanodiamonds.

5. The process for producing single-walled carbon nanotubes according to claim 1 or 2, wherein the growth nuclei comprise nanodiamonds having a particle diameter of 0.5 to 4 nm.

6. The process for producing single-walled carbon nanotubes according to claim 1 or 2, wherein the growth nuclei are nanodiamonds treated in air at a high temperature of 500 to 700° C. and formed to have a particle diameter of 0.5 to 4 nm.

7. The process for producing single-walled carbon nanotubes according to claim 1 or 2, wherein the growth nuclei comprise nanodiamond particles and wherein the 50% particle diameter of the nanodiamond particles before high-temperature treatment in air is 4 to 10 nm.

8. The process for producing single-walled carbon nanotubes according to claim 1 or 2, wherein the growth gas for growth of carbon nanotubes in the initial growth state is any of a hydrocarbon, an alcohol, a mixture of a hydrocarbon and an alcohol, a mixture of a hydrocarbon and water, and a mixture of a hydrocarbon, an alcohol, and water and the growth gas for stationary growth of carbon nanotubes in the stationary growth stage is any of a hydrocarbon, an alcohol, a mixture of a hydrocarbon and an alcohol, a mixture of a hydrocarbon and water, and a mixture of a hydrocarbon, an alcohol, and water.

9. The process for producing single-walled carbon nanotubes according to claim 8, wherein the alcohol is ethanol and the hydrocarbon is acetylene.

10. The process for producing single-walled carbon nanotubes according to claim 9, wherein argon is added to acetylene as a diluent.

11. The process for producing single-walled carbon nanotubes according to claim 1 or 2, wherein a temperature on an upstream side of a substrate in the furnace is 700 to 900° C.; a temperature of the substrate periphery on which the carbon nanotubes are grown is 600 to 850° C.; and the temperature on the upstream side is always equal to or higher than the temperature of the substrate periphery.

12. The process for producing single-walled carbon nanotubes according to claim 1, wherein in the furnace, a partial pressure of the growth gas is 0.1 Pa to 20 kPa in the initial growth stage and 0.02 Pa to 10 kPa in the stationary growth stage; and the pressure of the growth gas for stationary growth of carbon nanotubes in the stationary growth stage is lower than the pressure of the growth gas for growth of carbon nanotubes in the initial growth stage.

13. The process for producing single-walled carbon nanotubes according to claim 1 or 12, wherein both the growth gas for growth of carbon nanotubes in the initial growth stage and the growth gas for stationary growth of carbon nanotubes in the stationary growth stage are acetylene; a partial pressure of acetylene is 0.5 Pa to 20 Pa in the initial growth stage and 0.02 Pa to 10 Pa in the stationary growth stage; and the partial pressure of acetylene used in the stationary growth stage is lower than the partial pressure of acetylene in the initial growth stage.

14. The process for producing single-walled carbon nanotubes according to claim 1 or 2, wherein in the furnace, total pressure of all gases used for the carbon nanotube growth is 0.02 Pa to 100 kPa.

* * * * *